M. PERREUR-LLOYD.
APPARATUS FOR THE ELECTROLYTIC PRODUCTION OF ZINC, COPPER, OR OTHER METALS.
APPLICATION FILED DEC. 14, 1915.
1,235,724.
Patented Aug. 7, 1917.
3 SHEETS—SHEET 1.
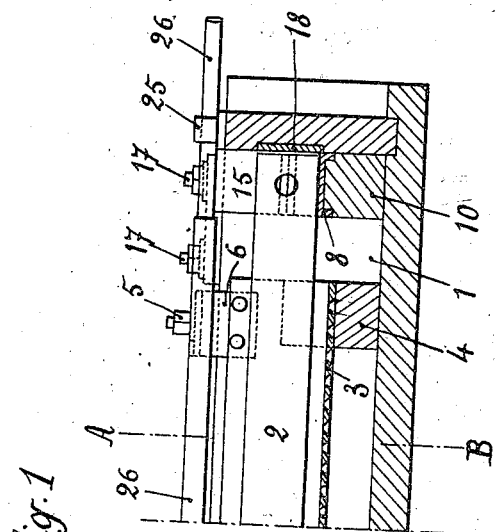
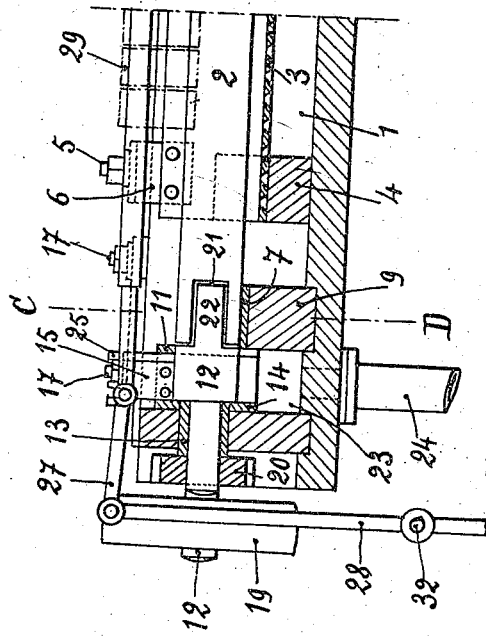
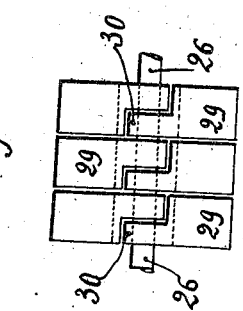
Inventor
Marcel Perreur-Lloyd
By Atty's
Fraser, Turk & Myers

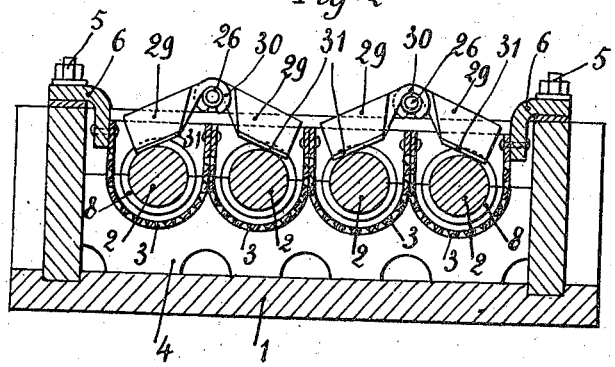
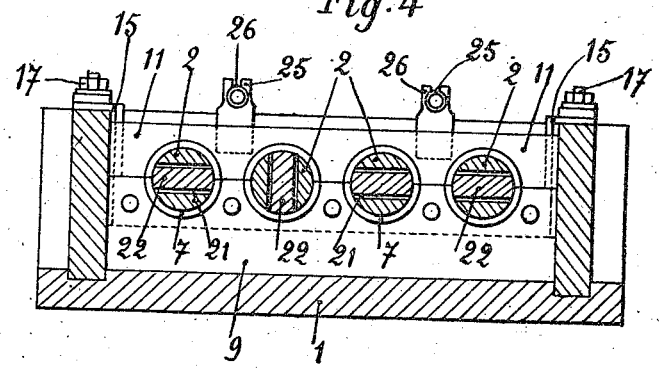
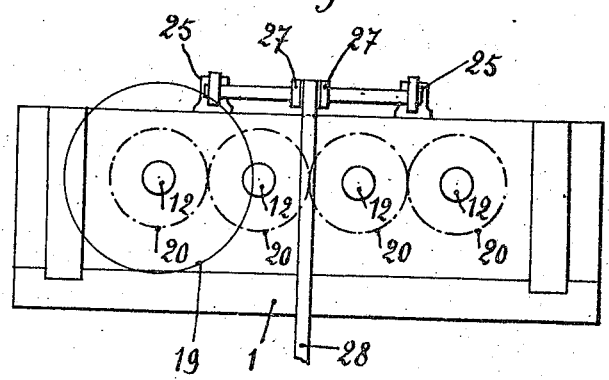

M. PERREUR-LLOYD.
APPARATUS FOR THE ELECTROLYTIC PRODUCTION OF ZINC, COPPER, OR OTHER METALS.
APPLICATION FILED DEC. 14, 1915.
1,235,724.
Patented Aug. 7, 1917.
3 SHEETS—SHEET 3.
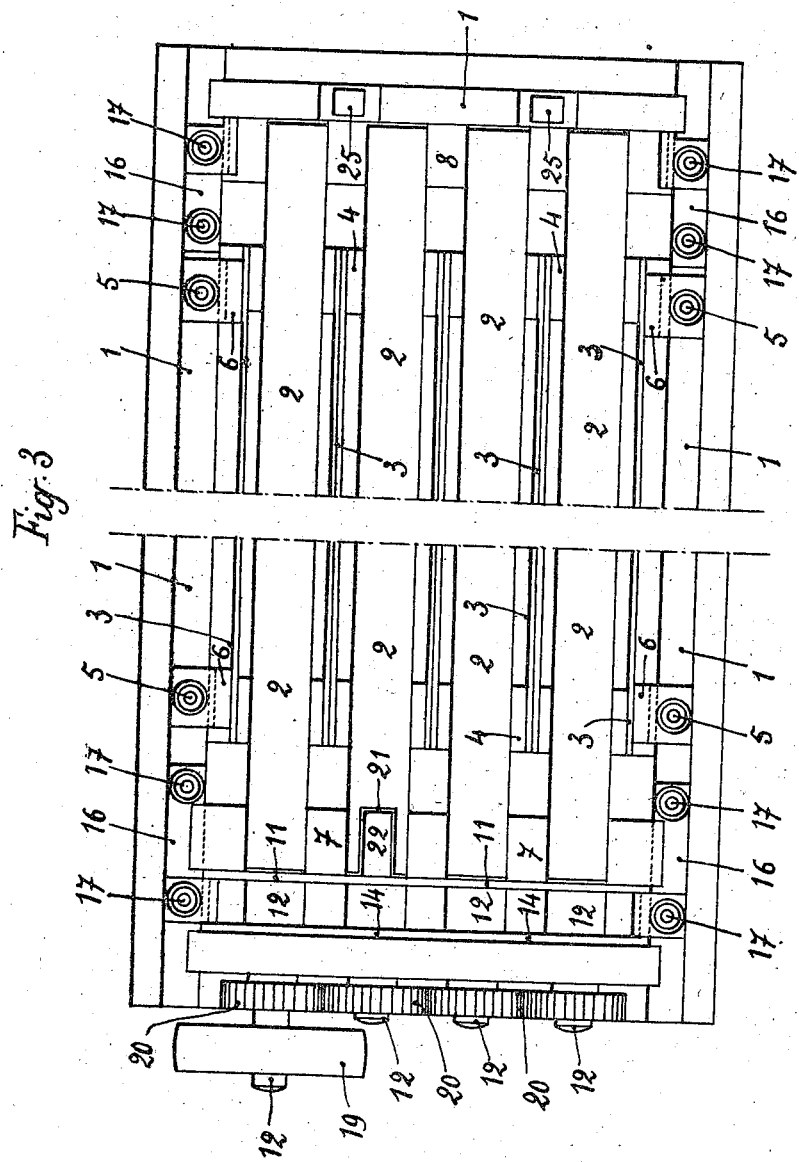
Inventor:
Marcel Perreur-Lloyd
By Attys
Fraser, Turk & Myers

UNITED STATES PATENT OFFICE.

MARCEL PERREUR-LLOYD, OF BOULOGNE-SUR-SEINE, FRANCE, ASSIGNOR TO MARIE VICTORINE BAILLY, WIDOW GARIN, OF PARIS, FRANCE.

APPARATUS FOR THE ELECTROLYTIC PRODUCTION OF ZINC, COPPER, OR OTHER METALS.

1,235,724. Specification of Letters Patent. Patented Aug. 7, 1917.

Application filed December 14, 1915. Serial No. 66,851.

*To all whom it may concern:*

Be it known that I, MARCEL PERREUR-LLOYD, a citizen of the Republic of France, residing in Boulogne-sur-Seine, Seine, France, have invented certain new and useful Improvements in Apparatus for the Electrolytic Production of Zinc, Copper, or other Metals, of which the following is a specification.

In the electrolytic deposition of metals and particularly for the electrolytic production of zinc, it is desirable in order to obtain deposits free from rugosity and as smooth or glossy as possible, to have recourse to a combination of means which is realized in the electrolytic apparatus about to be described with reference to the accompanying drawings.

The novel features of this apparatus will appear from the following description and from the claiming causes appended thereto.

Figure 1 is a longitudinal section of the apparatus,

Fig. 2 is a cross section on line A—B, of Fig. 1,

Fig. 3 is a plan thereof with the impregnators removed,

Fig. 4 is a cross section on line C—D of Fig. 1,

Fig. 5 is an end view thereof looking on to the driving mechanism,

Fig. 6 is a part plan showing the impregnators mounted on the operating rod,

Fig. 7 is a detail view showing a driving arrangement for the rubbers.

The apparatus, which is suitable for the electrolytic treatment of any metal, and particularly for zinc, copper, and so forth, is composed of a rectangular vessel 1, preferably of slate, which contains the liquid electrolyte and the electrodes.

The vessel contains several rotary cathodes 2, in any desired number, four being shown in the drawing. These cathodes are formed of slightly conical mandrels of small diameter and considerable length. They are surrounded by anodes 3 which envelop them almost completely and are formed as a sort of trough of perforated lead open at top. These anodes rest on supports 4 at each of their ends, and their lateral edges are riveted or secured together.

The outer edges of the side troughs are connected to the terminals 5 by conductors 6.

The space at the top of the anodes 3 allows on the one hand of removing the mandrels or cathodes 2 when the thickness of zinc deposited is sufficient, and on the other hand permits of the longitudinal displacement of an apparatus having for its function to remove the bubbles of hydrogen which always tend to be deposited on the surface of the cathode cylinders, and also to regulate the action of the gelatin which may, if desired, be added to the baths to improve the deposits, as will be explained later.

The cathode mandrels 2 are carried and rotate in half bearings 7 and 8 arranged in supports 9 and 10 placed at each end of the vessel 1.

The half bearings 7 at the driving side are prolonged upward by a metal plate 11 which at this side forms the edge properly speaking of the vessel containing the electrolyte.

The cathode mandrels 2 are rotated by means of small shafts 12 revolving at one end in bearings 13 carried by the wall of the vessel, and at the other end in the plate 11. A second plate 14 is disposed against the inside of the wall of the vessel 1, and a conductor 15, placed between the plates 11 and 14, connects the cathodes to the circuit connection 16 by means of the bolts 17.

At the other end of the vessel 1 the circuit connection is effected by an analogous conductor 15 and bolts 17, the conductor 15 being connected to a plate 18 in contact with the half bearings 8.

Rotation is imparted to the shafts 12 by means of a driving pulley 19 mounted on one of them, which transmits the motion to the others by means of toothed wheels 20.

To enable the cathode mandrels to be readily withdrawn from the bath when a sufficient thickness of zinc has been deposited, the temporary connection of these mandrels with the shafts 12 is effected by means of a coupling joint preferably constituted by mortises 21 formed in the mandrels 2 and engaging on tenons 22 cut on the ends of the shafts 12.

As there is no joint at the point of rotation of the shafts 12 in the plate 11, a little electrolyte liquid might escape from the vessel. In order to prevent the possibility of these inevitable leakages reaching the driving mechanism, there is disposed between the plates 11 and 14 a sort of receiving compartment 23, in the bottom of which the liquid collects and from which it can be run off by a pipe 24. At the top of the vessel 1 are arranged guides 25 in which slide tubes 26 carrying the impregnator-rubbers, which receive a longitudinal reciprocating motion whereof the starting and terminating points are continually varied, so that the rubbers do not move between the same points and the whole outer surface of the metal deposited on the cathodes is therefore rubbed and cleaned successively; without this, stripes or striations would be formed on the metal deposited on the cathodes as the result of the rubbing pads always stopping and starting at the same points.

This reciprocating movement of the rubbers 26, the principle of which does not form part of the invention, is produced according to the invention by a special arrangement comprising a link or rod 27 receiving motion from a rocking lever arm 28.

The lever 28 is pivoted at a fixed point 32 and is connected at the bottom to a connecting rod 33 driven by a crank pin 34 fixed on a plate or disk 35. Motion is imparted to the disk 35 as follows:

A toothed wheel 36 mounted on the driving shaft, or on an intermediate shaft, transmits the motion to a wheel 37 running loose on a fixed axle 38 on which is mounted a toothed wheel 39, likewise fixed, and with the teeth of which gears another wheel 40 in fixed connection with the crank disk 35 and adapted to turn on an axle carried by the toothed wheel 37. The numbers of teeth of the fixed wheel 39 and of the movable wheel 40 being prime to each other, it follows that the reciprocating movement imparted to the rubbers is continually varied with the object above explained.

The arrangement for removing the bubbles of hydrogen from the surface of the cathode cylinders and also for smoothing or glossing and rendering even the surface of the metallic deposit, consists of light fingers 29 (Figs. 2 and 6) provided with hooks 30 allowing them to be readily placed on and taken off the tubes 26, on which they are simply hooked.

These light fingers 29 simply rest by their own weight on the cathode mandrels 2, and they are fitted or faced with wipers 31 formed of animal membranes, absolutely soft and supple, obtained from skins, bladders, intestines, etc., these membranes being insolubilized by immersion in aldehyde, acetone, or other analogous substance. These wipers, which do not wear, while they completely remove the hydrogen from the surface of the cathodes, likewise permit of regulating the action of the gelatin that may be added to the baths with the object of improving the deposits, the wipers acting by the gelatin that they contain and applying on the cathode mandrels that contained in the bath.

The animal matters may be replaced by vegetable matters impregnated with insolubilized gelatin, the fibers of which act like the skin from which it is extracted.

Claims:

1. Apparatus for the production of metals by electrolysis, comprising a rectangular vessel of small depth in which are mounted a plurality of rotary cathode mandrels of small diameter and great length, each surrounded by a perforated lead anode in the form of an open-topped trough, all the anodes being riveted or connected together and resting on supports disposed in the vessel, wiping impregnating pads of insolubilized animal substance being arranged to travel with an irregular reciprocating motion over the surface of the metal deposited on the cathode cylinders.

2. Apparatus for the production of metals by electrolysis, comprising a tank, a rotary cathode, wipers, and a rod for imparting an irregular reciprocatory motion to said wipers, said wipers having hooked fingers by which they are detachably connected to said rod.

3. Apparatus for the production of metals by electrolysis, comprising a tank, a rotary cathode, wipers, and a rod for imparting an irregular reciprocatory motion to said wipers, said wipers being faced with a soft, supple, insolubilized animal substance.

4. Apparatus for the production of metals by electrolysis, comprising a tank, a rotary cathode, wipers, and a rod for imparting an irregular reciprocatory motion to said wipers, said wipers being faced with a vegetable substance impregnated with insolubilized gelatin.

5. Apparatus for the production of metals by electrolysis, comprising a tank, a rotary cathode, wipers, and means for imparting an irregular reciprocatory movement to said wipers, said means comprising a lever, a crank-disk adapted to reciprocate said lever, means for revolving said crank-disk, and means for rotating said crank-disk during its revolution.

6. Apparatus for the production of metals by electrolysis, comprising a tank, a rotary cathode, wipers, and means for imparting an irregular reciprocatory movement to said wipers, said means comprising a lever, a crank-disk adapted to reciprocate said lever, means for revolving said crank-disk, and means for rotating said crank-disk during its revolution, the revolution of said crank-disk having an odd relation to its rotation.

7. Apparatus for the production of metals by electrolysis, comprising a tank, a rotary cathode, wipers, and means for imparting an irregular reciprocatory movement to said wipers, said means comprising a lever, a crank-disk adapted to reciprocate said lever, a gear wheel for revolving said crank-disk, and a gear adapted to rotate said crank-disk while revolving, said gears having a number of teeth which are prime to one another.

In witness whereof, I have hereunto signed my name in the presence of two subscribing witnesses.

MARCEL PERREUR-LLOYD.

Witnesses:
CHAS. P. PRESSLY,
RENÉ BARDY.